(12) United States Patent
Hitchings, Jr.

(10) Patent No.: US 6,594,484 B1
(45) Date of Patent: Jul. 15, 2003

(54) AUTOMATED ACCESS BY MOBILE DEVICE TO AUTOMATED TELEPHONE INFORMATION SERVICES

(75) Inventor: Sinclair H. Hitchings, Jr., Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/215,116

(22) Filed: Dec. 17, 1998

(51) Int. Cl.[7] .......................... H04M 3/42; H04M 11/10
(52) U.S. Cl. ...................... 455/414; 455/413; 455/566; 379/67.1
(58) Field of Search ................................ 455/412, 413, 455/414, 418–420, 422, 466, 556, 557, 566, 564; 379/67.1, 88.18, 93.07, 93.08, 93.25, 100.14, 114.17, 201.01, 207.11; 340/825.44

(56) References Cited

U.S. PATENT DOCUMENTS

| | | | | |
|---|---|---|---|---|
| 5,524,139 A | | 6/1996 | Jones ........................... 379/67 |
| 5,737,393 A | * | 4/1998 | Wolf ............................ 379/67 |
| 5,765,142 A | | 6/1998 | Allred et al. .................. 705/26 |
| 5,809,415 A | | 9/1998 | Rossmann ................... 455/422 |
| 5,822,405 A | * | 10/1998 | Astarabadi .................... 379/88 |
| 5,838,252 A | * | 11/1998 | Kikinis .................. 340/825.44 |
| 6,104,924 A | * | 8/2000 | Shirai .......................... 455/418 |
| 6,125,287 A | * | 9/2000 | Cushman et al. ........... 455/566 |
| 6,167,429 A | * | 12/2000 | Mercer et al. ............... 709/203 |
| 6,195,417 B1 | * | 2/2001 | Dans .......................... 379/67.1 |
| 6,317,484 B1 | * | 11/2001 | McAllister ............... 379/88.02 |
| 6,385,202 B1 | * | 5/2002 | Katseff et al. .............. 370/401 |

* cited by examiner

Primary Examiner—Duc Nguyen
(74) Attorney, Agent, or Firm—Beyer Weaver & Thomas, LLP

(57) ABSTRACT

A method and system for automated navigation through voice menu information systems for mobile devices are disclosed. Navigation of the voice menu information systems is accomplished using a stored script (i.e., a time ordered log of the input associated with a previous interaction). A user wishing to store such a script, prior to an interaction with a voice menu system, would select this option from a menu displayed on the display screen of the wireless client device. The user is prompted to provide a label for the script. The labeled script is then created and stored by monitoring the input characters and timings thereof. After a new script has been stored, the information used to generate menu displays pertaining to available scripts for the wireless client device is updated to reflect the addition of the new script. Thereafter, for future interactions with the voice menu information system, the user need only select the appropriate script label when displayed by interacting with the wireless client device. Once a script has been launched, the script causes automated dial-in to the voice menu information system and interaction therewith in an automated fashion by way of the script. Following the processing of the script, the user can be on-line with the voice menu information system to receive the response or can have the response sent to a designated voice mailbox for later retrieval.

44 Claims, 11 Drawing Sheets

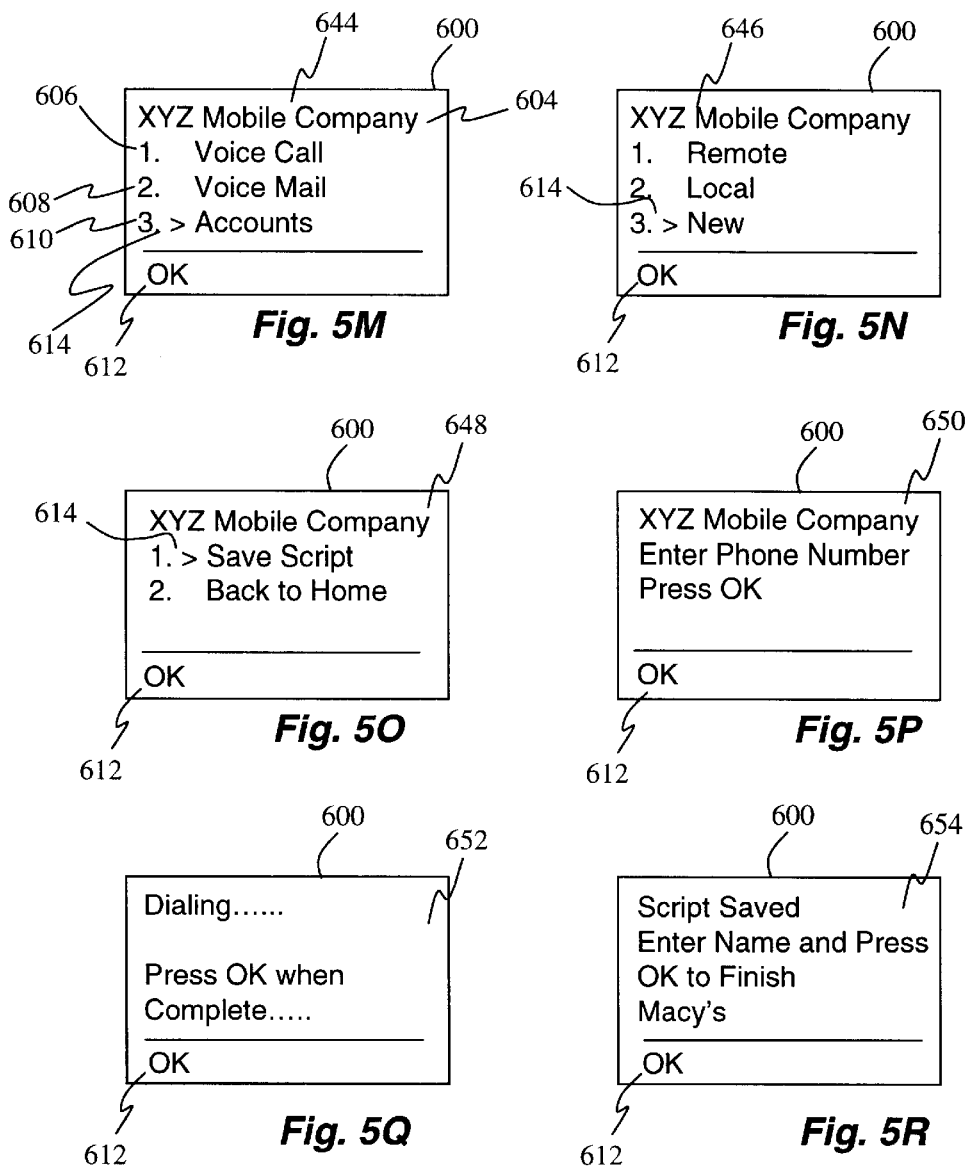

AUTOMATED ACCESS BY MOBILE DEVICE TO AUTOMATED TELEPHONE INFORMATION SERVICES

BACKGROUND OF THE INVENTION

1. Field of the Invention

The present invention relates to mobile devices and, more particularly, to voice activation support for mobile devices.

2. Description of the Related Art

Because customers of financial institutions demand easy access to their account information, financial institutions set-up customer service centers to provide account information. Customer service representatives originally staffed these customer service centers, but as the demand for this service grew, so did the costs for running them. In response to the growing costs, the financial institutions turned to the customer service technology industry for a solution. In 1988, Chase Manhattan bank became one of the first to install an Interactive Voice Response (IVR) system which allowed customers to access their information by navigating a voice menu and make selections using dial tone multi-frequency (DTMF) signals from any phone. Today almost every major financial institution offers this service to its customers.

To access the system, customers dial a number and then enter their account number and password to gain access to a variety of information. Bank customers can find out amount due on a loan, date and amount last deposited, and current interest rates on loans. Stock market investors can similarly call computerized telephony systems managed by their brokerage firms to obtain the latest information relating to the status of their portfolio. Credit card customers can also access their accounts to determine their current balance, the available credit remaining, and the date of the last received payment. City, state and federal revenue departments have also begun to provide taxpayers with the current status of their accounts through computerized telephony systems.

With the growing popularity of mobile devices, such as personal digital assistants (PDAs) and cellular phones, customers can access their information from any location having cellular service availability. A problem arises, however, because the average customer has so many accounts (e.g., the average American has between 4 and 5 credit cards—National Network for Family Resiliency) that they can't keep track of the information required to gain access to the information available on voice menu information services. Additionally, the phone number is 10 characters, the average length of an account number is 16 characters, passwords generally have between 4 and 12 characters, and inputting 38 characters, without mistake, on a mobile device can prove to be a challenge.

There is, therefore, a great need for a method and system which will allow mobile service subscribers to gain access to their financial accounts in an efficient manner using an input interface of a mobile device.

SUMMARY OF THE INVENTION

The present invention has been made in consideration of the above described problems and needs and has particular application to a system which allows mobile service subscribers to access information from automated telephone information services in an efficient manner using two-way interactive communication devices capable of communicating with a server device over a wireless data network.

The invention can be implemented in numerous ways, including as a method, an apparatus, a computer readable medium, and a computer system. Several embodiments of the invention are discussed below.

As a graphical user interface for facilitating automated access by a wireless two-way communication device to automated telephone information services, one embodiment of the invention includes a script selection menu and a selection device. The script selection menu is presented on a display device of the wireless two-way communication device. The script selection menu also includes a plurality of script identifiers, and each of the script identifiers pertains to a script, with each of the scripts including a sequence of previously saved user input interactions associated with accessing a particular service provided by the automated telephone information services. The selection device that enables selection of one of the script identifiers being presented in the script selection menu.

As a method for providing a list of scripts that reproduce a time ordered sequence of user input interactions with a voice menu information system on a display screen of a wireless client device that includes an input interface, one embodiment of the invention includes the acts of: storing in a service server device a plurality of scripts received from a user; wherein the service server device comprises: a voice menu server for managing a plurality of scripts for a plurality of users, a storage device for storing the plurality of scripts for the plurality of users, wherein the plurality of scripts are grouped according to the user account numbers for the plurality of users; and a memory device for storing code used to generate lists corresponding to the plurality of stored scripts for the plurality of users; generating a list corresponding to the plurality of scripts received from the user; forwarding the list corresponding to the plurality of scripts received from the user to the wireless client device utilizing a proxy server device connected to the server device through a landnet operating in a first communications protocol and connected to the wireless client device through an airnet operating in a second communications protocol, wherein the link server device comprises an account manager for managing a plurality of user accounts each corresponding to a plurality of wireless client devices, a server module for converting from the first communications protocol to the second communications protocol, and a memory for storing the list corresponding to the plurality of scripts received from the user, wherein the list is forwarded to the wireless client device when a communications session is established between the proxy server device and the wireless client device.

As a method for obtaining a script on a display screen of a wireless client device that includes an input interface, each of the scripts reproducing a time ordered sequence of user input interactions with an automated telephone-based information access system, one embodiment of the invention includes the acts of: displaying a list of script identifiers that correspond to a plurality of scripts for use by the wireless client device; generating and forwarding a request to a remote server device to obtain at least one of the scripts associated with the script identifiers; receiving the at least one script at the wireless client device from the remote server device in response to the request; and storing at the wireless client device the at least one script that has been received.

As a method for providing a list of scripts on a display screen of a wireless client device that includes an input interface, each of the scripts reproducing a time ordered sequence of user input interactions with an automated telephone-based information access system, one embodiment of the invention includes the acts of displaying a list of script identifiers that correspond to a plurality of scripts on the display screen of the wireless client device; receiving a selection of one of the script identifiers being displayed on the display screen, the selected script identifier corresponds to a selected one of the scripts; and forwarding a request to a remote server device to execute the selected one of the scripts to access the automated telephone-based information access system in an automated manner.

As a method for providing a list of scripts that reproduce a time ordered sequence of user input interactions with a voice menu information system on a display screen of a wireless client device that includes an input interface, one embodiment of the invention includes the acts of: storing in a memory in the wireless client device a plurality of scripts corresponding to previous input interaction with the voice menu information system; producing a list of scripts corresponding to the plurality of scripts stored in the memory in the wireless client device; displaying the list of scripts corresponding to the plurality of scripts stored in the memory in the wireless client device; activating one of the plurality of scripts through a predefined input interaction with the list of scripts being displayed to automatically produce a time ordered sequence of user input interactions; and supplying the time ordered sequence of user input interactions to the voice menu information system through a telephone network.

As a system for automated access to an automated telephone information system, one embodiment of the invention includes a plurality of wireless communication devices, and a server device. Each of the wireless communication devices include a storage device for storing a plurality of scripts, with each of the scripts pertaining to a time ordered sequence of user input interactions for the automated telephone information system, a display screen, a memory for storing computer program code for a processor, and a processor coupled to the storage device and the memory, the processor operates to execute the computer program code in the memory to display a script menu having entries associated with the plurality of scripts, and to allow activation of a selected one of the scripts by selection of the associated one of the entries of the script menu. The server device provides storage for the scripts for the wireless communication devices, the scripts are stored such that they are associated with user accounts for users associated with the wireless communication devices.

As a computer readable medium including program code for obtaining a script on a display screen of a wireless client device that includes an input interface, each of the scripts reproducing a time ordered sequence of user input interactions with an automated telephone-based information access system, one embodiment of the invention includes: computer program code configured to display a list of script identifiers that correspond to a plurality of scripts for use by the wireless client device; computer program code configured to generate and forward a request to a remote server device to obtain at least one of the scripts associated with the script identifiers; computer program code configured to receive the at least one script at the wireless client device from the remote server device in response to the request; and computer program code configured to store at the wireless client device the at least one script that has been received.

As a computer readable medium for selection of a script using a display screen of a wireless client device that includes an input interface, each of the scripts reproducing a time ordered sequence of user input interactions with an automated telephone-based information access system, one embodiment of the invention includes computer program code configured to display a list of script identifiers on the display device that correspond to a plurality of scripts provided on the wireless client device; computer program code configured to receive a selection of one of the script identifiers being displayed on the display screen, the selected script identifier corresponds to a selected one of the scripts; and computer program code configured to forward a request to a remote server device to execute the selected one of the scripts to access the automated telephone-based information access system in an automated manner.

As a computer readable medium that includes program code for providing a list of scripts that reproduce a time ordered sequence of user input interactions with a voice menu information system on a display screen of a wireless client device that includes an input interface, one embodiment of the invention includes: first program code configured to access a list of scripts, each of the scripts associated with the list of scripts reproduce a time ordered sequence of user input interactions with a voice menu information system, the list of scripts being stored in the wireless client device; and second program code configured to display a screen display of the list of scripts.

The advantages of the invention are numerous. Different embodiments or implementations may yield one or more of the following advantages. One advantage of the present invention is to enable users of wireless client devices to navigate voice menu information systems using a user interface provided on a small display screen associated with the wireless client devices.

Other aspects and advantages, together with the foregoing, are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
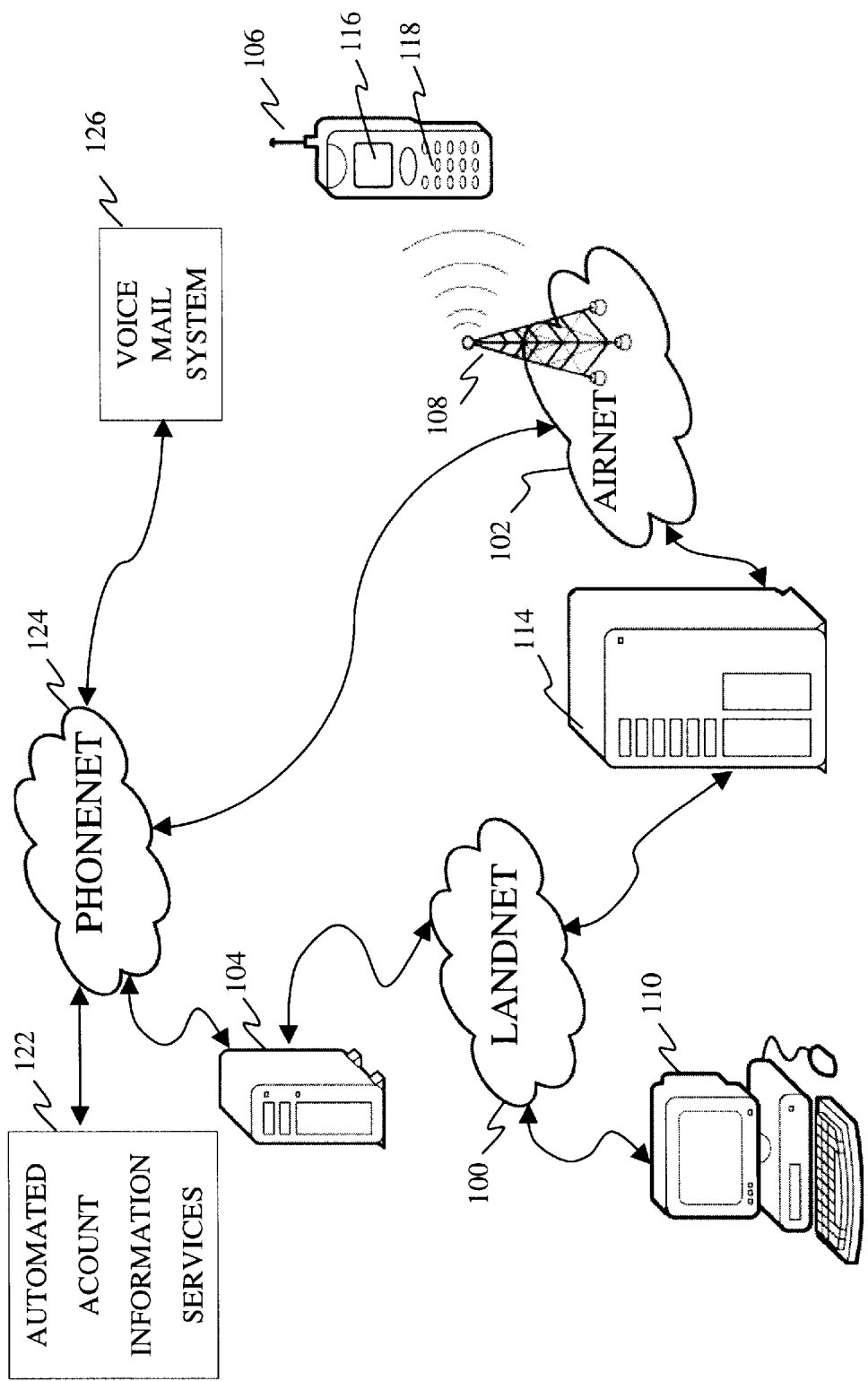
FIG. 1 illustrates a schematic configuration in which the present invention may be practiced.

The invention pertains to techniques that enable mobile service subscribers to access information from automated telephone information systems in an efficient manner using two-way interactive communication devices capable of communicating with a server device over a wireless data network.

Two-way interactive communication devices, also referred to as mobile or wireless client devices, include but are not limited to, personal digital assistant (PDA) like portable devices, cellular phones or wireless capable remote controllers, and typically have much less computing resources than a desktop or laptop computer does. The mobile devices, not a combination of a computer and a wireless communication module, have a small display screen and a phone keypad for a user to interact with the server device to access mobile subscriber services as opposed to a full power computer that has a full screen and a functional keyboard along with a mouse.

Customers will generally access certain types of information, such as their financial accounts, on a regular basis. The access to such information is through an ordered sequence of specific user interactions. For example, consider the case where a credit card customer desires to access their account information using a telephone information system. The customer initially dials a particular number associated with a particular credit card's telephone information system (11 input characters), then inputs their credit card number (16 input characters), inputs their social security number (9 input characters), and selects the desired information (1 or more input characters). Manually performing this same sequence to access the same information in the future involves a significantly redundant user activity.

According to the invention, scripts are saved to record numbers previously input and timing relationships between them such that future accesses to the same information can be automatically performed without having to again manually enter the input characters. The invention discloses a method and system for navigating a plurality of voice menu information systems using a display and input interface of a wireless client device. Navigation of the voice menu information systems is accomplished using a stored script (i.e., a time ordered log of the input associated with a previous interaction). A user wishing to store such a script, prior to an interaction with a voice menu system, would select this option from a menu displayed on the display screen of the wireless client device. The user is prompted to provide a label for the script. The labeled script is then created and stored by monitoring the input characters and timings thereof After a new script has been stored, the information used to generate menu displays pertaining to available scripts for the wireless client device is updated to reflect the addition of the new script. Thereafter, for future interactions with the voice menu information system, the user need only select the appropriate script label when displayed by interacting with the wireless client device. Once a script has been launched, the script causes automated dial-in to the voice menu information system and interaction therewith in an automated fashion by way of the script. Following the processing of the script, the user can be on-line with the voice menu information system to receive the response or can have the response sent to a designated voice mailbox for later retrieval.

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art. The present invention is a method and system which will allow wireless client devices (i.e., personal digital assistants (PDAs), cellular phones, or wireless capable remote controllers) to interact with voice menu information systems using the resident display screen and input interface. The method along with the system to be described in detail below is a sequence of processes or steps leading to a desired result. These operations or processes are those requiring physical manipulations of physical quantities. Usually, though not necessarily, these quantities may take the form of electrical signals capable of being stored, transferred, combined, compared, displayed and otherwise manipulated in a computer system or electronic computing device. It proves convenient at times, principally for reasons of common usage, to refer to these signals as bits, values, elements, symbols, operations messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiments

Referring now to the drawings, in which like numerals refer to like parts throughout the several views, FIG. 1 is a block diagram of an information retrieval system according to one embodiment of the invention. Landnet 100 is a landline network that may be the Internet, an Intranet or a data network of other private networks. Coupled to landnet 100 are a personal computer (PC) 110 and an information server device 104. Personal computer 110 may be a commonly available desktop computer and run a HyperText Markup Language (HTML) browser, such as Netscape Navigator from Netscape Communications Corporation. The browser can communicate with the information server device 104 via landnet 100 using HyperText Transfer Protocol (HTTP) to thus access information stored in the information server device 104. As an example, the information server device 104 is a workstation computer such as available from Sun Microsystems, Inc. The information stored in the information server device 104 may be hypermedia information. Additionally, the information server device 104 may also have a firewall.

Also shown in FIG. 1, a plurality of voice mail information services 122 can be accessed using phonenet 124. The voice menu information services 122 are typically automated account information centers which may be utilized by customers having the appropriate account and authorization information as well as access to a dial tone multi-frequency (DTMF) capable input device. Phonenet 124 is a standard land based phone communications network. The information retrieval system also can provide voice mail services by way of voice mail system 126 coupled to phonenet 124. The voice mail system 126 allows users of the wireless client device 106 to retrieve and reply to voice mail messages designated for the user.

Serviced by airnet 102 are a plurality of two-way wireless interactive communication devices 106, referred to as wireless client devices herein, though only one representation is shown in the figure. Wireless client device 106 is one of those two-way interactive communication devices and is capable of communicating, via airnet 102, wirelessly with antenna 108. For simplicity, antenna 108 also represents a wireless carrier infrastructure that generally comprises a base station and an operations and maintenance center. The base station controls radio or telecommunication links with mobile devices, including two-way wireless interactive communication devices. The operations and maintenance center comprises a mobile switching center performing the switching of calls between the mobile devices and other fixed or mobile network users. Further, the operations and maintenance center manages mobile services, such as authentication, and oversees the proper operation and setup of the wireless network. Possibly, all user accounts may be managed in a carrier infrastructure associated with airnet 102 as well.

Between landnet 100 and airnet 102 there is a proxy server device 114 functioning as a network gateway server which, for example, may be a workstation or a personal computer. Proxy server device 114 is coupled between airnet 102 and landnet 100. Generally, the communication protocol in airnet 102 is different from that in landnet 100. Hence, one of the functions that proxy server device 114 performs is to map or translate one communication protocol to another, thereby the wireless device 106 coupled to airnet 102 can communicate with any of the server devices coupled to landnet 100 via proxy server device 114. The proxy server device 114 also provides account information, configuration information, services and scripts. The scripts provide automated access by an authorized user to the voice menu information services 122. In FIG. 1, the personal computer 110 and the information server device 104 are shown coupled to the landnet 100.

According to one embodiment, the communication protocol used by information server device 104 is the well-known HyperText Transfer Protocol (HTTP) or HTTPS, a secure version of HTTP, and runs on TCP (Transmission Control Protocol) and controls the connection of the HTML web browser in personal computer 110 to proxy server device 114, and the exchange of information therebetween. The communication protocol between wireless client device 106 and proxy server device 114 via airnet 102 is, for example, Handheld Device Transport Protocol (HDTP) (formerly known as Secure Uplink Gateway Protocol (SUGP)), which preferably runs on User Datagram Protocol (UDP) and controls the connection of an HDML web browser in wireless client device 106 to proxy server device 114, where HDML stands for Handheld Device Markup Language. HDML, similar to that of HTML, is a tag based document language and comprises a set of commands or statements specified in a card that specifies how information is displayed on a small screen 116 of the wireless client device 106. Normally a number of cards are grouped into a deck that is the smallest unit of HDML information that can be exchanged between the wireless device 106 and proxy server device 114. The specifications of HDTP, entitled "HDTP Specification" and HDML, entitled "HDML 2.0 Language Reference" are incorporated herein by reference in their entirety.

To facilitate the description of the present invention, the wireless communication protocol in use is HDTP and the markup language in use is HDML. These are presented for purposes of illustration and not limitation. One skilled in the art will appreciate that the present invention can be practiced using other communications protocols (e.g., Wireless Session Protocol (WSP)) and markup languages (e.g., Compact Hypertext Markup Language (cHTML) and Wireless Markup Language (WML)).

It should be noted that HDTP is a session-level protocol that resembles HTTP but without incurring the overhead thereof and is highly optimized for use in thin devices, such as mobile devices, that have significantly less computing power and memory than a desktop personal computer. Further, it is understood to those skilled in the art that UDP does not require a connection to be established between a client and a server before information can be exchanged, which eliminates the need of exchanging a large number of packets during a session created between a client and a server. Exchanging a very small number of packets during a transaction is a desired feature for a mobile device with very limited computing power and memory to effectively interact with a landline device.

Some of the features in wireless client device 106 that make the disclosed system work more efficiently are described below. According to one embodiment, wireless client device 106 includes a display screen 116 and a phone keypad 118 which allow a user thereof to communicate interactively with wireless client device 106. Phone keypad 118 preferably provides a typical phone keypad, a pair of generic buttons and at least a pair of upward and downward arrow buttons. The typical phone keypad, as commonly seen, comprises twelve buttons. Of the twelve buttons, ten buttons are consecutively numbered, each for one of the numerals 0 to 9, respectively, one button is for "*" sign and the other button is for "#" sign. The four extended buttons, the generic buttons and the arrow buttons provide convenient and efficient means for a user to interact with wireless client device 106. Further, it is to be understood by those of ordinary skill in the art that the present invention may be practiced using input interfaces (e.g., softkeys or iconic screens) other than a phone keypad.

Further, there is a working memory (not shown) in wireless client device 106. Compiled and linked processes of the present invention are typically stored in the working memory as a client module that causes wireless client device 106 to operate with, for example, proxy server device 114. Upon activation of a predetermined key sequence utilizing keypad 118, for example, a microcontroller in wireless client device 106 initiates a communication session request to proxy server device 114 using the client module in the working memory. Upon establishing the communication session, wireless client device 106 typically receives a single HDML deck from proxy server device 114 and stores (caches) the deck in the working memory. As described above, an HDML deck comprises one or more cards and each card includes the information required to generate a screen display on display screen 116. The number of cards in a card deck can be selected to facilitate efficient use of the resources in wireless client device 106 and in airnet network 102.

As used herein, a display screen is the physical display apparatus in a wireless client device, such as a 4-line by 20-character Liquid Crystal Display (LCD) screen. A screen display is an image presented or displayed on the display screen. Further, it is understood that a display screen having display lines is only for illustrative purposes and many display screens in reality are graphics-based and do not necessarily have distinct display lines. It will be appreciated that the principles of this invention are equally applicable thereto.

Although the information retrieval system illustrated in FIG. 1 includes the proxy server device 114, it should be understood that the information retrieval system does not require that a proxy server device be present. Instead, the airnet 102 could couple the landnet 100 directly, which would allow the wireless client device 106 to access information servers, such as the information server 104.

Figure 2A:
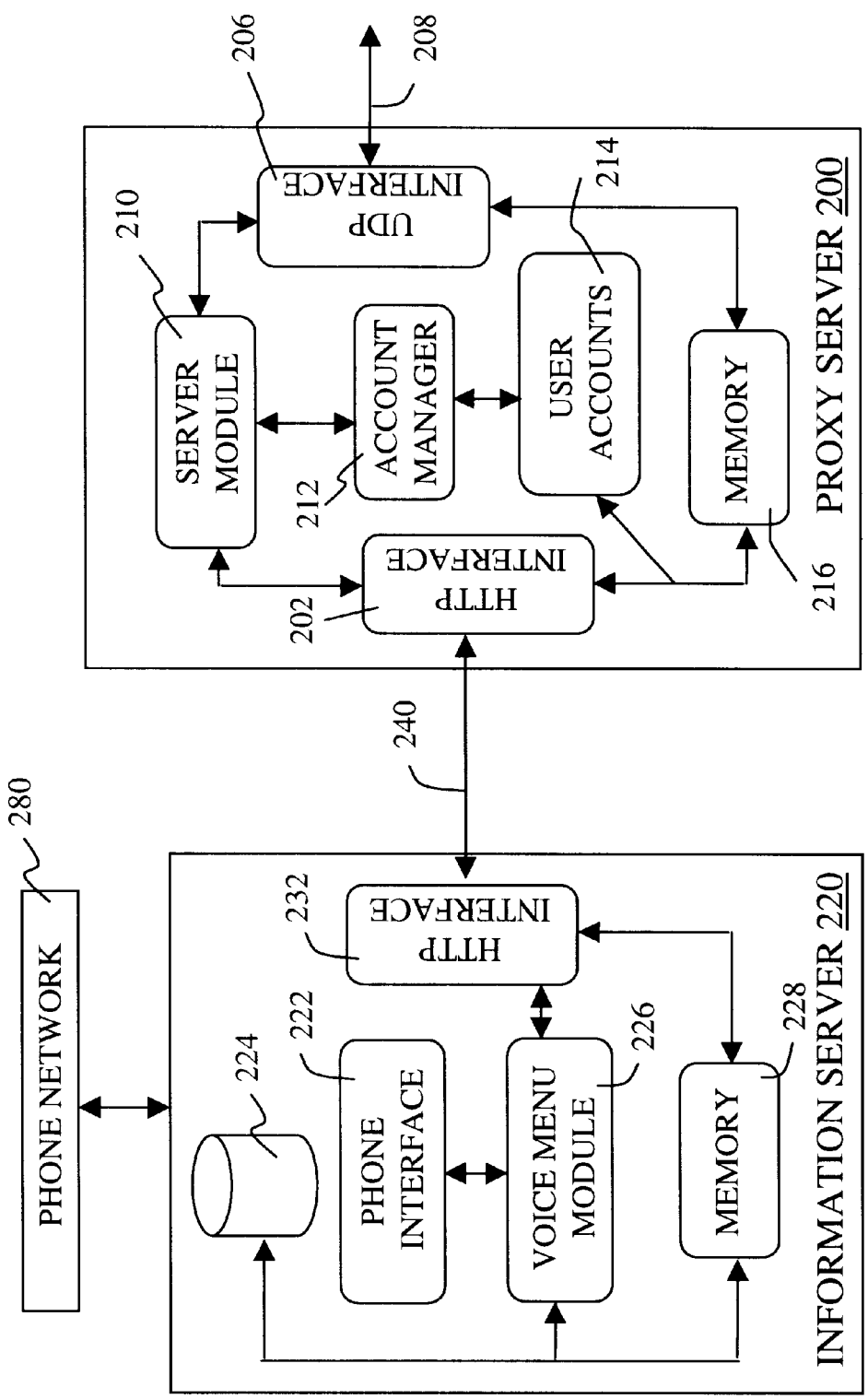
FIGS. 2A and 2B illustrate functional block diagrams of a service server device, a proxy (link) server device and a wireless client device according to an embodiment of the present invention.
Figure 2B:
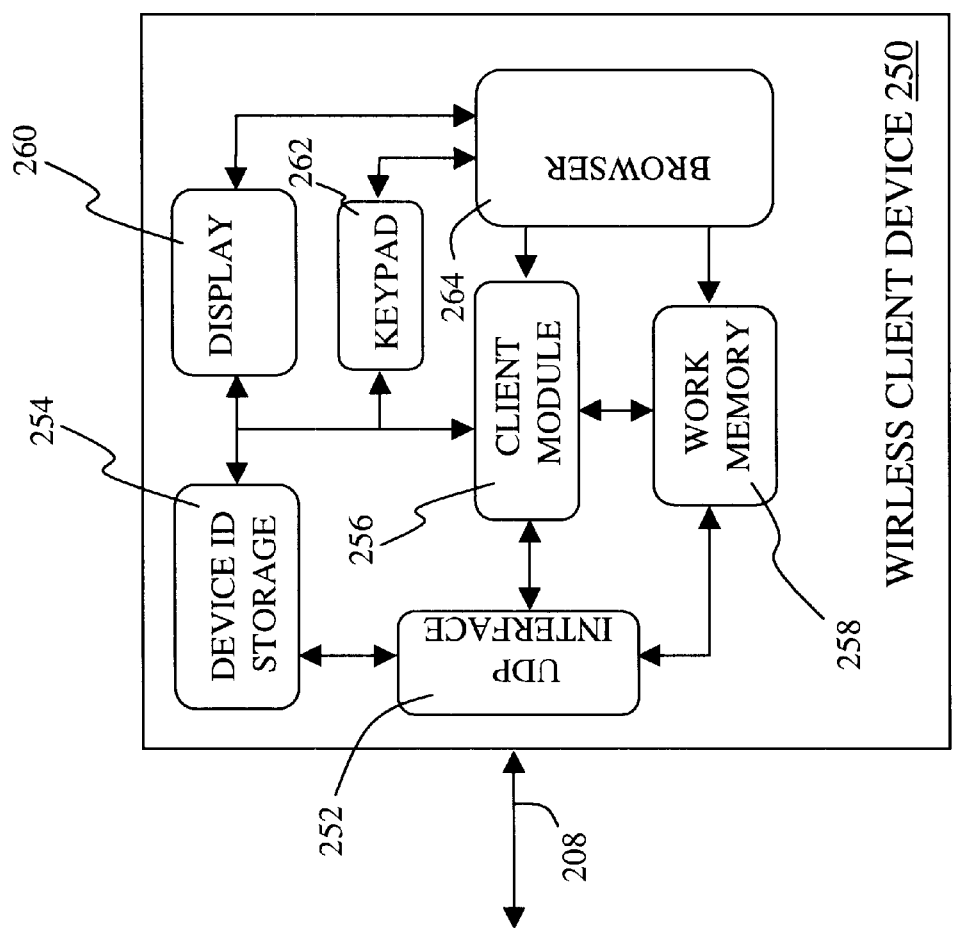

FIGS. 2A and 2B illustrate functional block diagrams of proxy server device 200, information server device 220 and wireless client device 250, according to one embodiment of the present invention. Proxy server device 200 and information server device 220 respectively represent proxy server device 114 and information server device 104 illustrated in FIG. 1, and are typically server computers. Wireless client device 250 can, for example, correspond to wireless client device 106 of FIG. 1. To avoid obscuring the principle aspects of the present invention, well known methods, procedures, components and circuitry in proxy server device 200, information server device 220 and wireless client device 250 are not described in detail. Further, it is understood to those skilled in the art that a server device used herein pertains to a piece of hardware equipment that comprises one or more microprocessors, working memory, buses and interfaces and other components. On the other hand, a server module herein means processes used within the server device to perform designated functions through the parts and components in the server device. Likewise, the wireless client device 106 also pertains to a piece of hardware equipment that comprises one or more microprocessors, working memory, buses and other interfaces and components, and that the client module pertains to processes used within the wireless client device to perform designated functions.

Proxy server device 200 comprises a HTTP interface 202 that couples to a landnet (e.g., landnet 100 of FIG. 1), a UDP interface 206 that couples to an airnet (e.g., airnet 102 of FIG. 1) via a carrier's infrastructure (not shown) and a server module 210 coupled between HTTP interface 202 and UDP interface 206. The server module 210 is also coupled to an account manager 212. It should be noted that the landnet may be the Internet 204 and the airnet is a wireless communications network. Further, it will be appreciated that the airnet can use a wide variety of wireless networks, examples of which include Cellular Digital Packet Data (CDPD), Global System for Mobile Communications (GSM), Code Division Multiple Access (CDMA) and Time Division Multiple Access (TDMA), to name a few.

Server module 210 performs traditional server processing as well as protocol conversion processing from one communication protocol to another communication protocol. According to the present embodiment, the protocol conversion processing, sometimes implemented in a separate module referred to herein as a mapper, includes protocol conversion between UDP and HTTP, wherein the conversion is a straight data mapping relationship. It is understood to those skilled in the art that other interface modules can readily replace UDP interface 206 when the wireless network uses another communication protocol. The HTTP interface 202 can also be replaced by another interface module when the landnet uses a different communication protocol.

Working with server module 210, account manager 212 manages a plurality of user accounts for all the wireless client devices serviced by proxy server device 200. It is understood that the user accounts may be stored in another network server coupled through the landnet. In other words, the user accounts can be kept in a database that is physically placed in any computing devices (e.g., information server device) coupled to the landnet and can be collected or fetched therefrom.

The information server device 220 is a server device performing operations relating to the storage, maintenance and utilization of information contained within a script library associated with a particular user account. Generally, information server device 220 comprises a phone interface 222, a storage device 224, voice menu server module 226 and memory 228. The phone interface 222 allows the information server device 220 to access a phone network 280 (124) which, in turn, allows the information server device 220 to access the voice menu information services 122.

Storage device 224 contains a plurality of user script databases corresponding to a plurality of user accounts serviced by proxy server device 200. The information contained within storage device 224 is received from wireless client device 250 via proxy server device 200 or from a personal computer connected to information server device 220 through a landnet connection (not shown). The contents in actual user script libraries or formats thereof do not affect the operations of the present invention.

Voice menu module 226 provides voice menu script database management and phone network access on information server device 220. The voice information services can be accessed via the phone network 280. Additionally, the voice menu script database management can generate a plurality of lists of available scripts associated with the plurality of user accounts managed by proxy server device 200. These lists are forwarded to proxy server device 200 where account manager 212 manages them.

Alternatively, the voice menu module 226 and the phone interface 222 of the information server device 220 illustrated in FIG. 2A can be provided within the proxy server 200. In such cases, the voice menu script database management as well as the phone network access can be provided by the proxy server 200.

Each of the wireless client devices, such as wireless client device 250 shown in FIG. 2B, is assigned a device identifier (ID). A device ID can be a phone number of the device or a combination of an Internet Protocol (IP) address and a port number, for example: 204.163.165.132:01905 where 204.163.165.132 is the IP address and 01905 is the port number. The device ID is further associated with a subscriber ID authorized by a carrier and stored in proxy server device 200 as part of the procedures to activate a subscriber account for wireless client device 250. The subscriber ID may take the form of, for example, "861234567-10900_pn.mobile.att.net" by AT&T Wireless Service, it is nevertheless a unique identification to wireless client device 250. In other words, each of wireless client devices serviced by proxy server device 200 has a unique device ID that corresponds to a respective user account in proxy server device 200. Additionally, this unique identifier may be used to store mail from a remote mail server awaiting delivery (i.e., an inbox). The following description is focused on wireless client device 250 and its associated account, it shall be appreciated by those skilled in the art that the description is equally applied to all mobile devices in communication with proxy server device 200.

Figure 3:
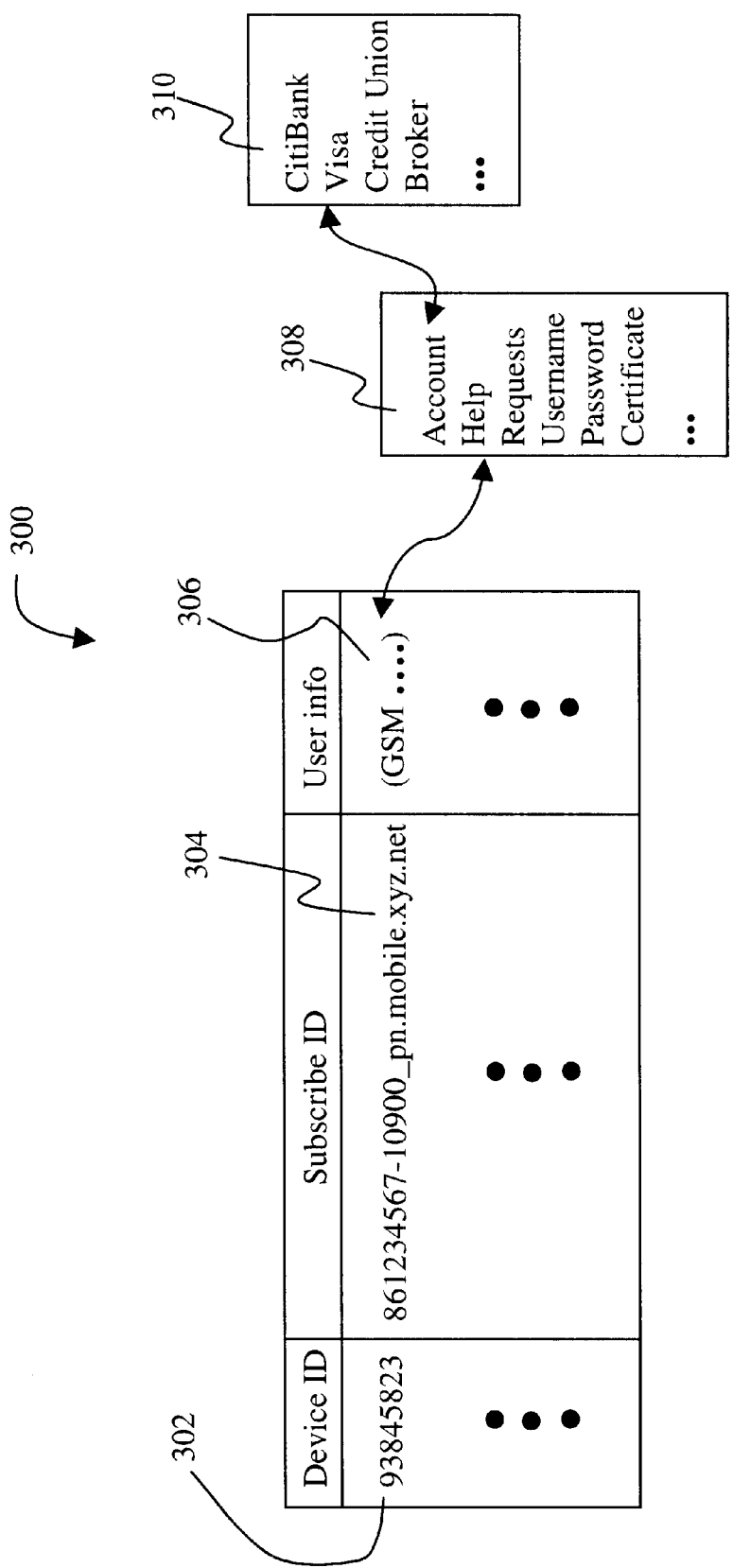
FIG. 3 depicts an account structure used in the description of the present invention.

Subscribers or user accounts, indexed by each respective device ID, are represented by a data structure 300 as shown in FIG. 3 according to one embodiment. Each record in data structure 300 comprises information about a subscriber, such as device ID 302, subscriber ID 304 and user info 306. User info 306 may include the account configuration information, for example, a GSM network normally with perhaps an option to switch to a CDPD network if necessary. Further, user info 306 may include pointers or linkages to other account related information, such as account index information 308 and further detailed account related information 310. As an example, for the "Script List" index shown in FIG. 3, the associated detailed account related information 310 includes a list of available scripts for accessing voice menu information systems. Account index information 308 along with detailed account related information 310 can be physically located together with data structure 300 or separately in one or more devices coupled to the landnet. In other words, the data structure 300 can be stored in the proxy server 114, 200 or the information server device 104, 220 illustrated in FIGS. 1 and 2A. When a request is made to retrieve specific information about an account, either the device ID or the subscriber ID 304 thereof must be provided so the account can be identified.

Returning to FIG. 2B, wireless client device 250 includes a UDP interface 252 that couples to carrier network 208 via a RF transceiver (not shown) to receive incoming and outgoing data signals. Device identifier (ID) storage 254 stores and supplies a device ID to UDP interface 252. The device ID identifies a specific code that is associated with wireless client device 250 and directly corresponds to the device ID in the user account typically provided in proxy server device 200. In addition, wireless client device 250 includes a client module 256 that performs many of the processing tasks performed by mobile device 250 including establishing a communication session with proxy server device 200 via carrier network 208, requesting and receiving data from carrier network 208, displaying information on a display screen 260 thereof, and receiving user input from keypad 262 as well. The client module 256 is coupled to UDP interface 252 for the establishment of a communication session and the requesting and receiving of data. Additionally, the client module 256 operates, among other things, a browser 264, commonly referred to as a micro-browser, which requires much less computing power and memory than the well-known HTML browser does. The micro-browser is, preferably, a Handheld Device Markup Language (HDML) micro-browser. Additional details on accessing a (proxy) server device from a mobile device including a (micro) browser are described in U.S. patent application Ser. No. 08/570,210, now U.S. Pat. No. 5,809,415, which is hereby incorporated by reference.

Figure 4:
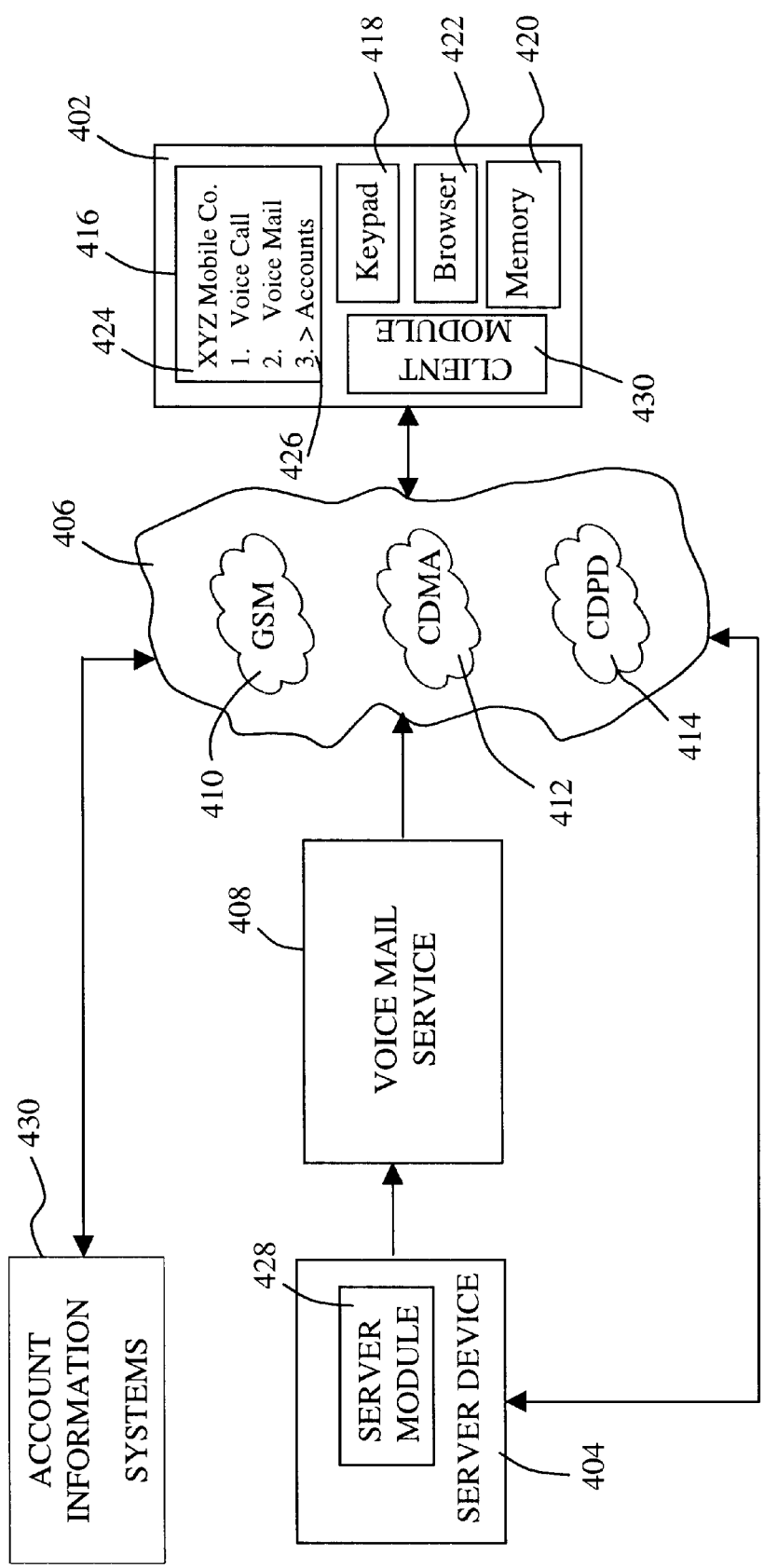
FIG. 4 depicts a system in which a request remote script initiation can be placed by practicing the present invention.

Prior to describing the invention in further detail, several illustrative examples of applications that can be implemented according to the principles of this invention are described. These applications are illustrative only and are not intended to limit the invention to the particular applications and features described. Referring now to FIG. 4, there is shown an exemplary system in which the present invention may be practiced to place a service request for information services from a voice menu information service through a wireless client device. Wireless client device 402 is serviced by proxy server device 404 via carrier wireless network 406. Carrier wireless network 406 comprises a number of wireless networks, for example, GSM 410, CDMA 412 and CDPD 414, each having its own communication methods and characteristics. In other words, a carrier may provide wireless services through a number of different wireless networks that may or may not be overlapping in a particular geographic area. Further, each wireless network subscribed by respective groups of customers may have a different airtime charge rate, depending on the time and locations of the use thereof.

Similar to wireless client device 250 of FIG. 2A, wireless client device 402 comprises a display screen 416, a keypad 418 and a working memory 420 that includes a device ID thereof. Preferably, wireless client device 402 further comprises a network browser 422 such as an HDML micro-browser. As a part of the procedures to activate wireless client device 402 with the carrier wireless network 406, wireless client device 402 is initially pre-configured to operate with a particular wireless network (i.e., GSM wireless network 410).

It is now understood that the information can be provided with respect to the corresponding user account maintained in proxy server device 404. According to the present embodiment, screen display 424 is provided in an HDML choice card, preferably cached in the memory 420 of wireless client device 402. The choice card comprises a list of choices, each choice corresponding to a selection that may be made with regard to available services and linked documents. To be more specific, screen display 424 shows that there are three choices, Voice Call, Voice Mail and Accounts, being displayed in an exemplary list of choices. The number of choices with a list of choices can vary widely with actual implementation preferences. As shown in screen display 424, the Accounts choice is indicated by a choice or element indicator 426 that can be moved upward and downward using keypad 418. If the user selects the third choice, namely Accounts, a selection or chosen preference is made after a predefined key is pressed. A client module 430 interprets the chosen preference and then generates a message corresponding to the chosen preference. The message is forwarded to proxy server device 404 using HTTP via the carrier wireless network 406.

The message requests the stored scripts that can be utilized on wireless client device 402 to obtain account information from a voice menu information service 430 in an automated fashion. Upon receiving the message from wireless client device 402, proxy server device 404 (using server module) accesses the user account and then identifies stored scripts that are associated with the user account. The identified scripts are then forwarded to wireless client device 402 where the user can select one of the scripts to be executed to thus obtain certain account information from the voice menu information service 430 in an automated fashion.

It should be noted that the user utilizes a wireless client device (or mobile device), such as a cellular telephone, that is capable of communicating over data capable wireless networks. A cellular telephone is, however, not a combination of a computer and a wireless communication module as seen in portable laptop computers. With a cellular telephone, a user enters data using only a standard phone keypad. In any case, a wireless client device eliminates the need for a full-size computer keyboard, separate pointing device or for a sophisticated touch screen that recognizes motion of a pointing object. This is important to maintaining the size, weight, power requirements, usability and mobility of the wireless client device. Furthermore, the service request, as an example, to switch from one wireless network to another wireless network, can be made by the user at any time from anywhere through the mobile device without incurring additional cost to the carrier and the user typically receives results of the service requests in a few seconds.

According to one embodiment of the present invention, and referring again to FIG. 4, proxy server device 404 contains a script list for wireless client device 402. The script list comprises a plurality of user defined labels associated with the stored scripts and a locator index which indicates whether the script is stored locally on wireless client device 402 or must be fetched from another server. When the Accounts choice is selected on wireless client device 402, a communications session is established with proxy server device 404 and screen descriptive display information corresponding to display screens with menu selections is returned to wireless client device 402. The menu selections allow a user to select a particular mode of operation for the system and the particular voice menu information service 430 to access.

The modes of operation include the following: 1) Process a script already resident in the wireless client device 402; 2) Fetch a non-resident script from proxy server device 402 and process it locally; and 3) Request remote processing of a script off-line with the response being forwarded to voice mail server 408. The remote processing of a script off-line can be performed by any server device or computer that can communicate via telephony with the voice menu information service such as the proxy server device 404 or some other server device such as the information server device 104 illustrated in FIG. 1.

Scripts are generated from previous interactions with voice menu information services 430. This initial interaction may be initiated from wireless client device 402 or from a server device or computer having landnet and telephone connectivity. If the interaction is initiated by wireless client device 402, a time ordered log of the input interaction is stored locally and a message detailing the interaction is forwarded to proxy server device 404 for storage. If the interaction is initiated by a server device or computer, a message detailing the time ordered log of the input interaction is forwarded to proxy server device 404 via the landnet. In either case, the script database is updated and an updated list representing the available scripts is perhaps forwarded to proxy server device 404.

Figure 5A:
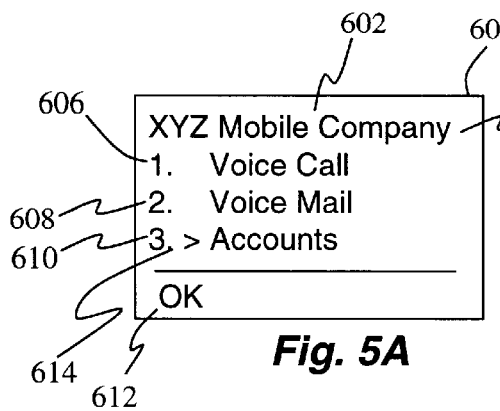
FIGS. 5A to 5R demonstrate an exemplary wireless client device visual interface by illustrating a sequence of screen displays according to an embodiment of the present invention.

Referring now to FIGS. 5A–5R, there are illustrated a series of screen displays on display screen 600 of a wireless client device (e.g., wireless client device 106 of FIG. 1) according to one embodiment. When the mobile device is turned on, an initial screen display 602 is displayed on display screen 600. Referenced by 612 is a soft key generally associated with one of the generic buttons in the keypad of the mobile device, such as the wireless client device 106. As described above, the soft key provides a mechanism to map a generic button into a specified button, namely, to press the generic button is equivalent to pressing an "OK" button when the soft key OK is displayed. Other means may be used to assign the soft key to one of the buttons existing in a standard phone keypad, such as the "#" key for a soft key on the right side of display screen 600.

Screen display 602 may be supplied by one of the choice cards in a deck cached in the working memory of the mobile device. The screen display 602 displays a menu screen 604 which includes information (e.g., text information) that is generally used to indicate the current screen display. The menu screen 604 includes a list with three selectable elements 606, 608, 610, with selectable element 610 being shown as selected as indicated by an element selection character (element indicator) 614. It is understood that selectable element 610 being initially selected is an implementation preference as any one of or none of the elements 606, 608, and 610 can be initially selected.

In this embodiment, a selected element is visually indicated to the user by the element indicator 614 placed after the numeric label "3" indicating that it is the third element in the menu screen 604 of screen display 602 that is selected. However, any other method, such as inverse image or video, a different element selection character, or the position of the element being always at the top or bottom of the display, could be used to indicate the specific element selected without having an impact on the operation of this invention.

The user can select a different element by vertically scrolling element indicator 614 up or down. The specific method used to move element indicator 614 up or down on display screen 602 is not an essential feature of this invention. Those skilled in the art can implement the invention with any desired mechanism for moving element indicator 614. For example, a thumb wheel, a mouse, or a rocking controller, such as those available in some video game machines, would work equally well as those mechanisms for scrolling element indicator 614.

Figure 5B:
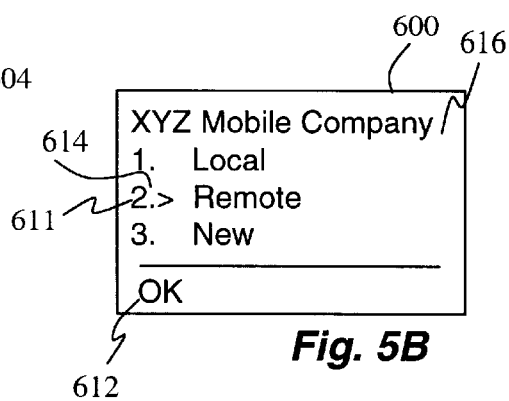
FIG. 5 illustrates a functional block diagram of a wireless communications network, which can be utilized in practicing the present invention.

In accordance with the present embodiment, the screen display 602 presents three choices (elements) to a user of the mobile device. A first choice 606 places the mobile device to a voice mode in which a user can dial a phone number to proceed with a normal phone call. A second choice 608 enables the user to access a designated voice mailbox associated with a voice mail system. A third choice 610 allows the user to obtain a script location menu screen including one or more locations for scripts. In FIG. 5B, the locations for the scripts can include "Local," "Remote," or "New." Pressing a predetermined key (i.e., the soft key associated with "OK") when element indicator 614 is aligned with the third choice will cause a menu screen 616 as shown in FIG. 5B to be displayed.

FIG. 5B shows that element indicator 614 is aligned with the "Remote" selection 611. This selection allows the user to view a list of labels associated with locations where the scripts are stored. Pressing "OK" will cause the menu screen 618 of FIG. 5C to be displayed.

Figure 5C:
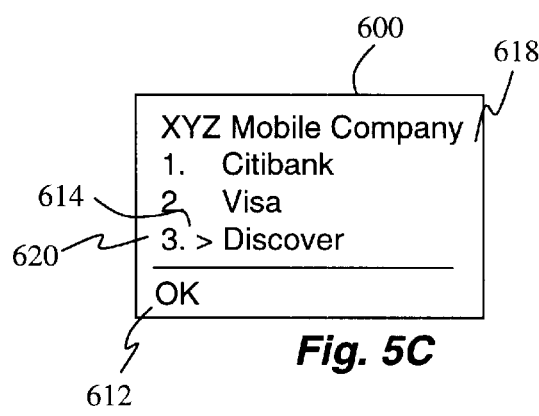
Figure 5D:
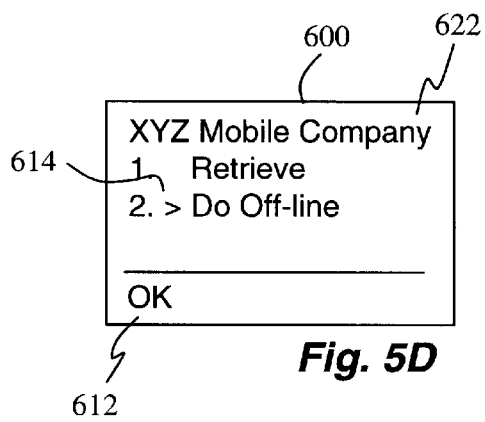
Figure 5E:
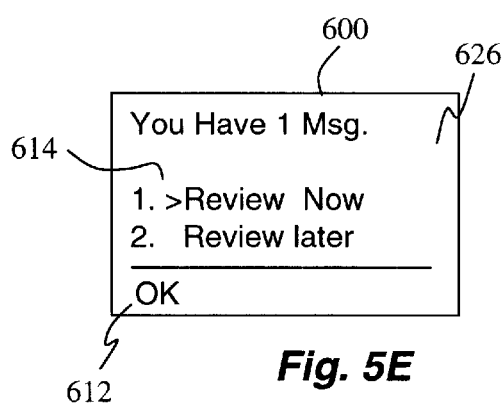
Figure 5F:
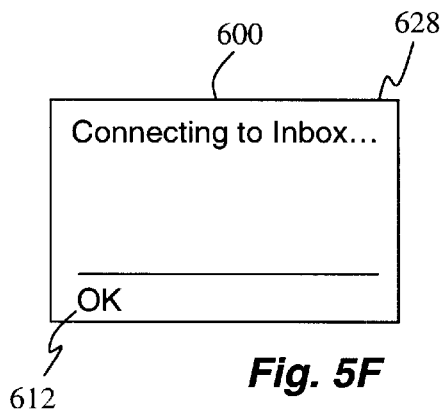
Figure 5G:
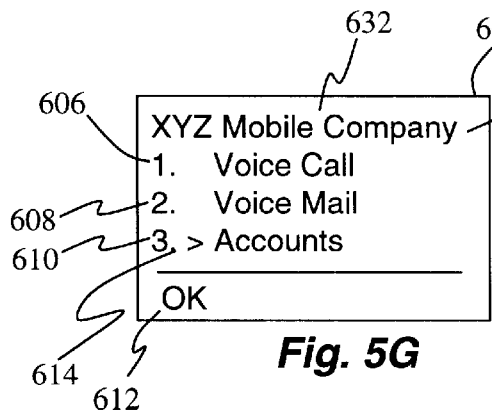
Figure 5H:
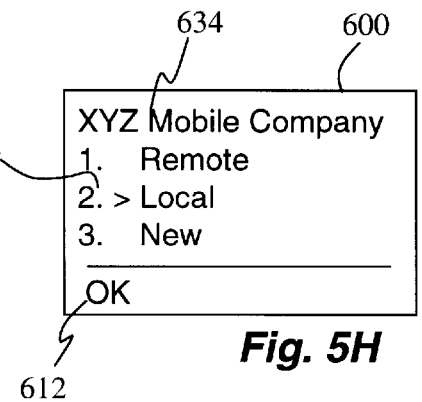
Figure 5I:
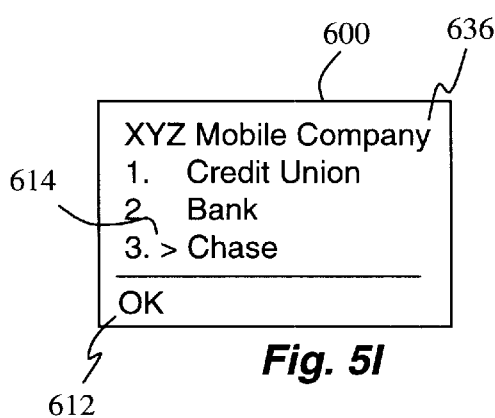
Figure 5J:
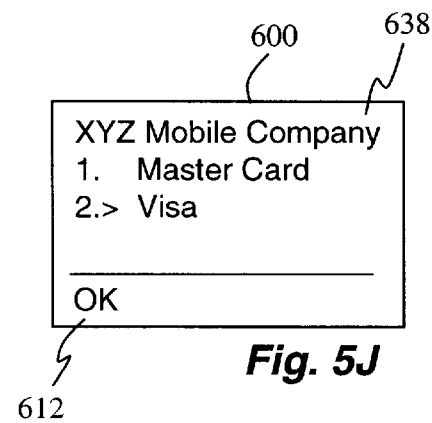
Figure 5K:
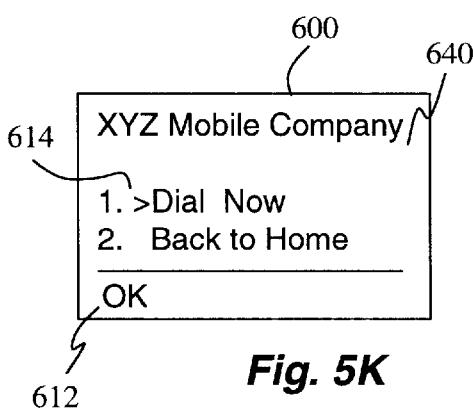
Figure 5L:
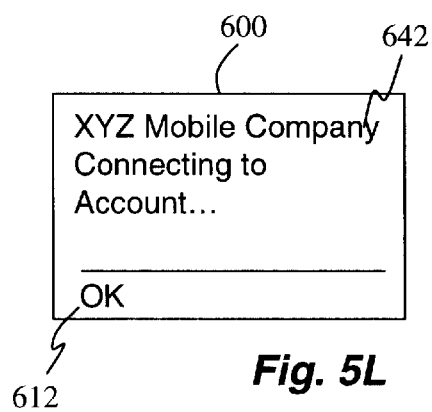

Referring to FIG. 5C, menu screen 618 displays labels associated with a plurality of stored scripts. In the example shown, indicator 614 is aligned with the third choice "Discover" 620. Pressing "OK" will cause the menu screen 622 of FIG. 5D to be displayed. The "Do-Off-Line" choice (the off-line mode of operation) causes the script associated with "Discover" to be processed by a service server (e.g., information server device 104, 110 or 114 of FIG. 1) as opposed to the mobile device. Thereafter, following the offline processing of the script, the response from the voice menu information services is forwarded to a designated voice mailbox and an indication is provided as shown in FIGS. 5E and 5F.

In a similar fashion, FIGS. 5G through 5L demonstrate the display screens provided when utilizing locally stored scripts. As demonstrated in FIGS. 5I and 5J, the script labels may be arranged in a hierarchical fashion, where cards associated with a common provider are grouped together, though such grouping is not required. Here, the script associated with "Visa" is selected in FIG. 5J, in connection to the voice menu information services initiated in FIG. 5K, and execution of the script to access account information in FIG. 5L.

FIGS. 5M through 5R show the display screens associated with adding a new script using the wireless client device. Selecting the "New" choice in FIG. 5N provides a user with screens for creating, storing and labeling a new script. Selecting the "Save Script" choice in FIG. 5O will cause a script relating to a pending access (FIGS. 5P and 5Q) of the voice menu information system to be recorded and saved. Referring to FIG. 5R, menu screen 654 allows the newly generated script to be labeled (e.g., Macy's) as desired by a user.

Figure 6A:
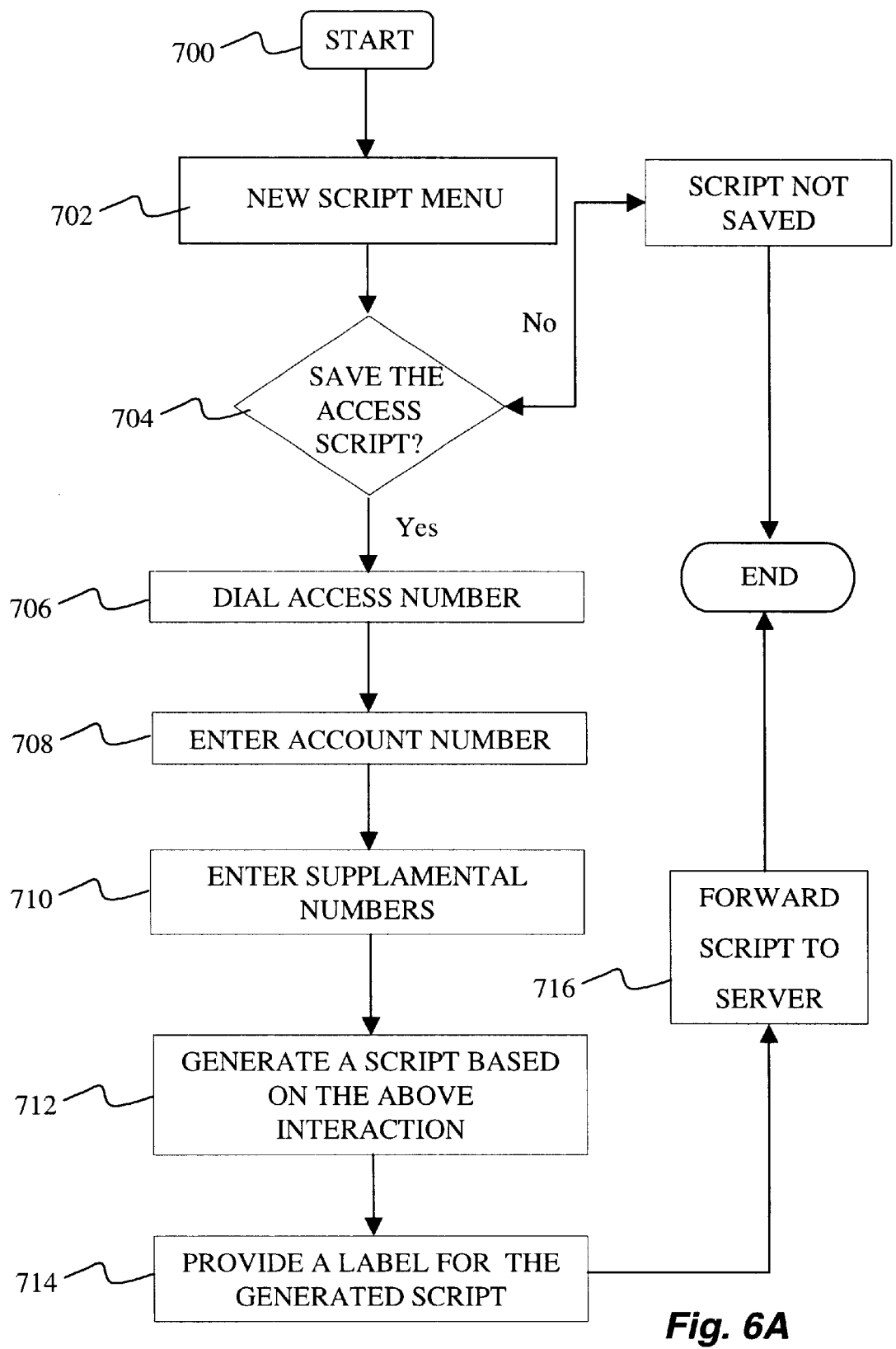
FIGS. 6A to 6C illustrate a process flowchart of the present invention according to one embodiment.
Figure 6B:
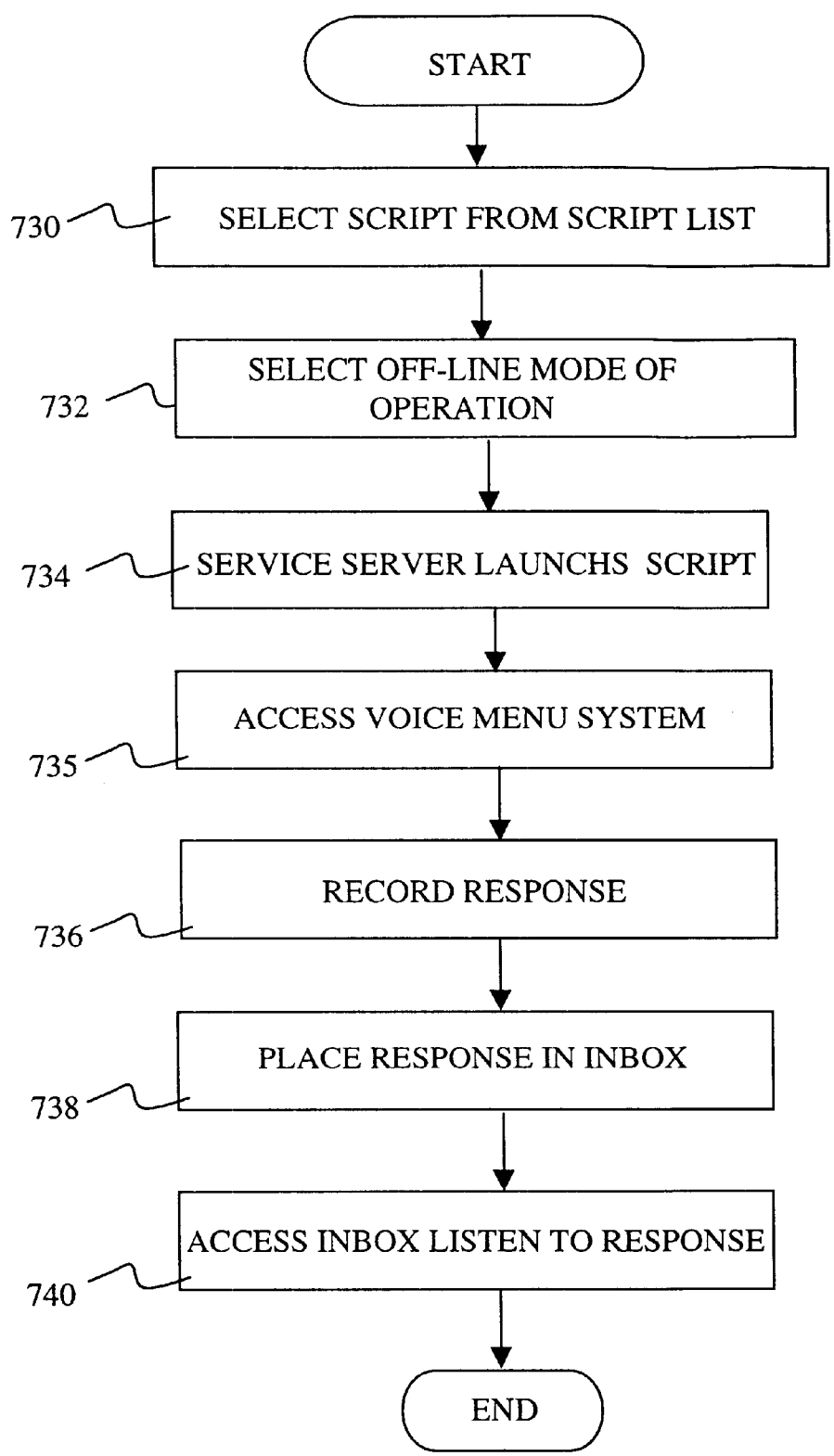
Figure 6C:
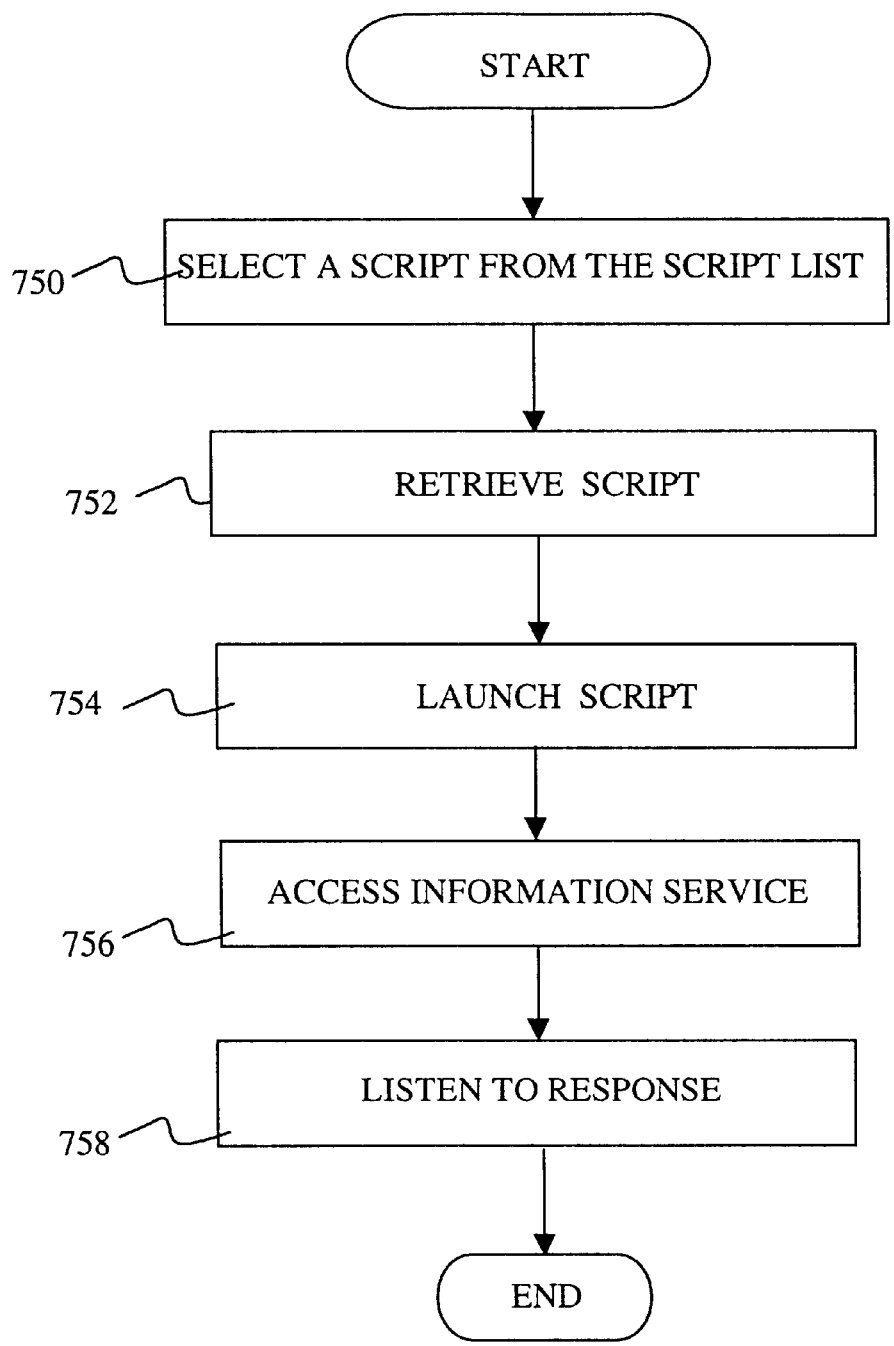

FIGS. 6A through 6C illustrate a process flowchart of script creation processing according to one embodiment of the present invention. At 700, a wireless client device is in a state that displays a menu comprising a link to access available mobile subscriber services that may further provide entries or choices to a plurality of aspects of the services including user accounts, help, service requests, etc. At 702, a user would view a screen display similar to that of FIG. 5N. Pressing OK would take the user to a menu screen (see FIG. 5O) where the wireless client device may be placed in a mode to monitor an interaction with a voice menu information service. As a result of the input interaction, a script is created so that monitored input interaction can be duplicated. Following block 702, a decision block 704 determines if the script is to be saved. When the script is to be saved, the wireless client device monitors the upcoming input interaction to produce the script. Once the wireless client device is ready to monitor the input interaction with the voice menu information system, the user is prompted to dial the phone number associated with the service provider at block 706.

The user then proceeds to interact with the voice menu information system as directed by the voice menu information system. Usually these systems require a user to input an account number at block 708 and a plurality of supplemental numbers at block 710 associated with menu selections and additional account identifiers (i.e., a social security number). Upon completion of the input interaction activities, a script (a compact message detailing the time ordered input sequences occurring during the interaction with the voice menu information system) is generated at block 712. The user is then prompted to provide a label to the newly generated script at block 714. The labeled script is stored locally (temporary storage) and is forwarded to a server device for long term storage at block 716. The server device is, for example, a proxy server device or other information server device. Following block 716, the script creation processing is complete and ends.

Referring to FIG. 6B, off-line mode processing according to one embodiment of the invention is described. The user selects a script label from the script list at block 730 to select a script. In this embodiment, the user is assumed to have selected off-line mode of operation. Hence, the user also chooses the off-line mode of operation at block 732. An access request is forwarded to the server device Upon receiving the access request, the server device retrieves and launches the requested script at block 734 to access the voice menu system at block 735. The server device records the response from the voice menu system at the appropriate point (i.e., when your balance is given) and forwards the recorded response to a designated voice mail inbox at block 738. The user can then review the response at a time of their choosing at block 740 by accessing their voice mail inbox.

Referring now to FIG. 6C, non-off-line mode processors according to one embodiment of the invention are described. A user selects a script label from the script list at block 750 to select a script. If the script is resident on the wireless client device it is accessed locally, or if the script is stored remotely on a server device then it fetches and caches locally at block 752. Next the wireless client device launches the script at block 754 and the voice menu information service is accessed automatically at block 756 using the script. The user has merely to listen to the response at block 758 without the need for tedious manual input of various strings of numbers into the wireless client device. Following block 758 the non-off-line mode processing is complete and ends.

It can be appreciated by now that the present invention provides an efficient means for mobile users to access their account information stored on voice menu information service systems. The present invention allows users to navigate these voice menu information systems with a minimal amount of input interaction (i.e., key strokes).

The present invention has been described in sufficient detail with a certain degree of particularity. It is understood to those skilled in the art that the present disclosure of embodiments has been made by way of example only and that numerous changes in the arrangement and combination of parts as well as operations may be resorted to without departing from the spirit and scope of the invention as claimed. Accordingly, the scope of the present invention is defined by the appended claims rather than the foregoing description of embodiments.

What is claimed is:

1. A graphical user interface for facilitating automated access by a wireless two-way communication device to automated telephone information services, said graphical user interface comprising:

a script selection menu presented on a display device of the wireless two-way communication device, said script selection menu includes a plurality of script identifiers, each of the script identifiers pertaining to a script, with each of the scripts including a sequence of previously saved user input interactions associated with accessing a particular service provided by the automated telephone information services;

a selection device that enables selection of one of the script identifiers being presented in said script selection menu; and a script location selection menu presented on the display device prior to the display of said script selection menu, said script location selection menu includes a remote script indicator and a local script indicator, wherein said selection device is used to enable selection of one of the remote script indicator and the local script indicator, wherein the remote script indicator indicates that the scripts to be displayed in said script selection menu are stored remotely with respect to said wireless two-way communication device, and wherein the local script indicator indicates that the scripts to be displayed in said script selection menu are stored within said wireless two-way communication device.

2. A graphical user interface as recited in claim 1, wherein said wireless two-way communication device is a cellular telephone.

3. A graphical user interface as recited in claim 1, wherein the script identifiers are labels.

4. A graphical user interface as recited in claim 1, wherein following selection of one of the script identifiers, the associated script is played such that a sequence of previous saved user input interactions are automatically performed without intervening manual user actions.

5. A method for providing a list of scripts that reproduce a time ordered sequence of user input interactions with a voice menu information system on a display screen of a wireless client device that includes an input interface, said method comprising:

storing in a service server device a plurality of scripts received from a user; wherein said service server device comprises:

a voice menu server for managing a plurality of scripts for a plurality of users;

a storage device for storing said plurality of scripts for said plurality of users; wherein said plurality of scripts are grouped according to the user account numbers for said plurality of users; and a memory device for storing code used to generate lists corresponding to said plurality of stored scripts for said plurality of users;

generating a list corresponding to said plurality of scripts received from said user;

forwarding said list corresponding to said plurality of scripts received from said user to said wireless client device utilizing a proxy server device connected to said server device through a landnet operating in a first communications protocol and connected to said wireless client device through an airnet operating in a second communications protocol; wherein said proxy server device comprises:

an account manager for managing a plurality of user accounts each corresponding to a plurality of wireless client devices;

a server module for converting from said first communications protocol to said second communications protocol; and a memory for storing said list corresponding to said plurality of scripts received from said user; wherein said list is forwarded to said wireless client device when a communications session is established between said proxy server device and said wireless client device.

6. A method as recited in claim 5, wherein said first communications protocol for said landnet is Hypertext Transport Protocol (HTTP) over Internet Protocol (TCP/IP) and said second communications protocol for said airnet is a wireless communications protocol.

7. A method as recited in claim 6, wherein said wireless communications protocol is selected from a group consisting of Wireless Application Protocol (WAP) and Handheld Device Transport Protocol (HDTP).

8. A method as recited in claim 5, wherein said first communications protocol for said landnet is Secure Hypertext Transport Protocol (HTTPS) over Internet Protocol (TCP/IP) and said second communications protocol for said airnet is a wireless communications protocol.

9. A method as recited in claim 8, wherein said wireless communications protocol is selected from a group consisting of Wireless Application Protocol (WAP) and Handheld Device Transport Protocol (HDTP).

10. A method as recited in claim 5, further comprising:

storing said list corresponding to said plurality of scripts received from said user as a markup language.

11. A method as recited in clam 10, wherein said markup language is selected from a group consisting of Hypertext Markup Language (HTML), Handheld Device Markup Language (HDML) and Wireless Markup Language (WML).

12. A method as recited in claim 5, wherein said list corresponding to said plurality of scripts received from said user comprises:

a URL for said service server device storing said list corresponding to said plurality of scripts received from said user; and a label for each script listed in said list corresponding to said plurality of scripts received from said user.

13. A method as recited in claim 5, wherein said method further comprises:

receiving a request from said wireless client device for one of said plurality of scripts listed on said list corresponding to said plurality of scripts received from said user; and forwarding said requested one of said plurality of scripts to said wireless client device.

14. A method for processing a script on a wireless client device that includes an input interface and a display screen, each script reproducing a time ordered sequence of user input interactions with an automated telephone-based information access system, said method comprising:

displaying a list of script identifiers that correspond to a plurality of scripts for use by the wireless client device;

generating and forwarding a request to a remote server device to obtain at least one of the scripts associated with the script identifiers;

receiving the at least one script at the wireless client device from the remote server device in response to the request;

storing at the wireless client device the at least one script that has been received; and executing, at the wireless client device, the at least one script that has been received to access the automated telephone-based information access system.

15. A method as recited in claim 14, wherein the wireless client device is a mobile telephone having an integrated display screen for displaying the list of scripts.

16. A method as recited in claim 14, wherein said executing of the at least one script is performed without requiring any user input interactions beyond initiating said executing.

17. A method as recited in claim 14, wherein the remote server device is a proxy server.

18. A method as recited in claim 14, wherein said forwarding of the request and said receiving of the at least one script are performed over a wireless data network.

19. A method as recited in claim 18, wherein the remote server device is a proxy server device, and wherein said proxy server device is connected to said wireless client device through the wireless data network using a first communications protocol and connected to an information server device through a wired data network using a second communications protocol.

20. A method as recited in claim 19, wherein the wired data network comprises the Internet.

21. A method as recited in claim 19, wherein said first communications protocol for the wireless data network is a wireless communications protocol and said second communications protocol for the wired data network is Hypertext Transport Protocol (HTTP) over Internet Protocol (TCP/IP).

22. A method as recited in claim 21, wherein said wireless communications protocol is selected from a group consisting of Wireless Application Protocol (WAP) and Handheld Device Transport Protocol (HDTP).

23. A method as recited in claim 19, wherein said wireless client device an also access information from the information server device through the wireless data network, said proxy server device, and the wired data network.

24. A method as recited in claim 14, wherein said request is in a markup language.

25. A method as recited in claim 24, wherein said markup language is selected from a group consisting of Handheld Device Markup Language (HDML) and Wireless Markup Language (WML).

26. A method for providing a list of scripts on a display screen of a wireless client device that includes an input interface, each of the scripts reproducing a time ordered sequence of user input interactions with an automated telephone-based information access system, said method comprising:

displaying a list of script identifiers that correspond to a plurality of scripts on the display screen of the wireless client device;

receiving a selection of one of the script identifiers being displayed on the display screen, the selected script identifier corresponds to a selected one of the scripts; and forwarding a request to a remote server device to execute the selected one of the scripts to access the automated telephone-based information access system in an automated manner.

27. A method as recited in claim 26, wherein the automated telephone-based information access system is provided via a telephone network.

28. A method as recited in claim 26, wherein said method further comprises:

obtaining a response from the automated telephone-based information access system following the execution of the script.

29. A method as recited in claim 26, wherein said method further comprises:

storing the response in a voice mail storage device associated with the wireless client device.

30. A method as recited in claim 26, wherein said method further comprises:

subsequently accessing the voice mail storage device via the wireless client device to retrieve the stored response and forward the stored response to the wireless client device.

31. A method as recited in claim 26, wherein said forwarding of the request to the remote file server is through a wireless data network, and wherein said wireless client device can also access information stored on the remote server device via the wireless data network.

32. A method as recited in claim 26, wherein the request is in a markup language.

33. A method for providing a list of scripts that reproduce a time ordered sequence of user input interactions with a voice menu information system on a display screen of a wireless client device that includes an input interface, said method comprising:

storing in a memory in the wireless client device a plurality of scripts corresponding to previous input interaction with the voice menu information system;

producing a list of scripts corresponding to said plurality of scripts stored in the memory in the wireless client device;

displaying the list of scripts corresponding to said plurality of scripts stored in the memory in the wireless client device;

activating one of said plurality of scripts through a predefined input interaction with said list of scripts being displayed to automatically produce a time ordered sequence of user input interactions without intervening manual user actions;

forwarding a copy of the one of said plurality of stored scripts to a remote server device after where said activating of the one of said plurality of scripts is performed; and supplying the time ordered sequence of user input interactions without intervening manual user actions to the voice menu information system via the remote server.

34. A method as recited in claim 33, wherein said displaying of the list of scripts and said activating of one of the plurality of scripts are performed on the wireless client device.

35. A method as recited in claim 33 wherein the wireless client device couples to the remote server device via a proxy server device, and the proxy server device is coupled to the wireless client device through a wireless data network using a first communications protocol and coupled to the remote server device through a wired data network using a second communications protocol.

36. A method as recited in claim 35, wherein said first communications protocol for the wireless data network is a wireless communications protocol and said second communications protocol for the wired data network is Hypertext Transport Protocol (HTTP) over Internet Protocol (TCP/IP).

37. A method as recited in claim 36, wherein said wireless communications protocol is selected from a group consisting of Wireless Application Protocol (WAP) and Handheld Device Transport Protocol (HDTP).

38. A method as recited in claim 33, wherein said method further comprises:

deleting an existing one of the scripts from the memory when a new script is to be stored in the memory; and updating the list of scripts corresponding to said plurality of scripts stored in the memory in the wireless client device to reflect the addition of the new script and the removal of the existing script.

39. A system for automated access to an automated telephone information system, said system comprises:

a plurality of wireless communication devices, each of said wireless communication devices include a storage device for storing a plurality of scripts, each of the scripts pertain to a time ordered sequence of user input interactions for the automated telephone information system, a display screen, a memory for storing computer program code for a processor, and a processor coupled to said storage device and said memory, said processor operates to execute the computer program code in said memory to display a script menu having entries associated with the plurality of scripts, and to allow activation of a selected one of the scripts by selection of the associated one of the entries of the script menu; and a server device that provides storage for the scripts for said wireless communication devices, the scripts being stored such that they are associated with user accounts for users associated with said wireless communication devices.

40. A system as recited in claim 39, wherein said server device is a proxy server device that couples between a wired data network and a wireless data network, and wherein the wireless data network is capable of coupling to said wireless communication devices to facilitate communications between said proxy server and said wireless communication devices.

41. A system as recited in claim 40, wherein the wired data network uses a first communications protocol and the wireless data network uses a second communications protocol that differs from the first communication protocol.

42. A system as recited in claim 39, wherein following activation of the selected one of the scripts, the selected one of the scripts is played such that a sequence of previously saved user input interactions are automatically performed without intervening manual user actions.

43. A computer readable medium including program code for processing a script on a wireless client device that includes an input interface and a display screen, each script reproducing a time ordered sequence of user input interactions with an automated telephone-based information access system, said computer readable medium comprising:

computer program code configured to display a list of script identifiers that correspond to a plurality of scripts for used by the wireless client device;

computer program code configured to generate and forward a request to a remote server device to obtain at least one of the scripts associated with the script identifiers;

computer program code configured to receive the at least one script at the wireless client device from the remote server device in response to the request;

computer program code configured to store at the wireless client device the at least one script that has been received; and computer program code configured to execute, at the wireless client device, the at least one script that has been received to access the automated telephone-based information access system.

44. A computer readable medium for selection of a script using a display screen of a wireless client device that includes an input interface, each of the scripts reproducing a time ordered sequence of user input interactions with an automated telephone-based information access system, said computer readable medium comprising:

computer program code configured to display a list of script identifiers on the display device that correspond to a plurality of scripts provided on the wireless client device;

computer program code configured to receive a selection of one of the script identifiers being displayed on the display screen, the selected script identifier corresponds to a selected one of the scripts; and computer program code configured to forward a request to a remote server device to execute the selected one of the scripts to access the automated telephone-based information access system in an automated manner.

* * * * *